March 1, 1949.  J. BRISKIN ET AL  2,463,016
OPTICAL COMPENSATOR
Filed March 19, 1945  2 Sheets-Sheet 1
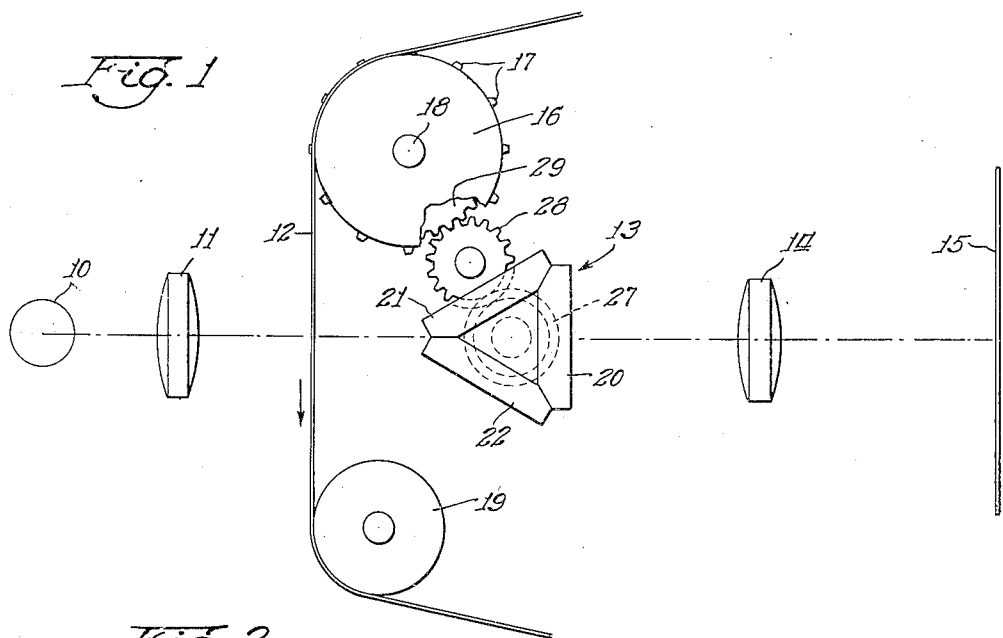
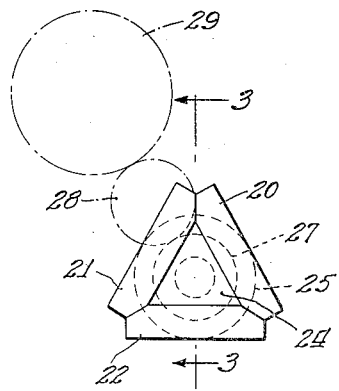
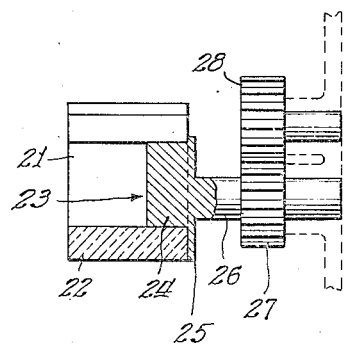
Inventors:
Jack Briskin and
Joseph A. Mankawich
By: Zabel, Carlson, Gritzbaugh and Wells March 1, 1949.　　　J. BRISKIN ET AL　　　2,463,016
OPTICAL COMPENSATOR Filed March 19, 1945　　　　　　　　　　2 Sheets-Sheet 2

Inventors:
Jack Briskin and
Joseph A. Mankawich
By: Zabel, Carlson, Gritzbaugh and Wells
Attys Patented Mar. 1, 1949

2,463,016

UNITED STATES PATENT OFFICE 2,463,016

OPTICAL COMPENSATOR

Jack Briskin and Joseph A. Mankawich, Chicago, Ill., assignors to Revere Camera Company, Chicago, Ill., a corporation of Delaware Application March 19, 1945, Serial No. 583,423

6 Claims. (Cl. 88—16.8)

This invention relates to optical compensators, and in particular, to those adapted for use in non-intermittent motion picture apparatus.

In non-intermittent motion picture apparatus the film is advanced continuously, and an optical compensator is used to compensate for the motion of the film so as to produce a stationary image, as in a projector, or to produce a moving image, as in a camera.

It is a primary object of this invention to provide a compensator embodying a minimum amount of shutter effect. The term "shutter effect" refers to periods in which the light beam is interrupted, or is refracted to an undesirable extent, as by emergence from a non-parallel face of the compensator. During such periods of course, the image is not projected on the screen. Therefore the shutter effect decreases the apparent intensity of the projected image; hence it is undesirable.

The embodiment of this invention which is herein described and shown shows the compensator as applied to projection apparatus.

That particular type of projection apparatus in which this invention has been found to be of particular utility is that known as a viewer. A viewer is a device which is used when editing the film to project a comparatively small image on a screen. Because the image is small, one is not so much concerned with the aberrations which are inherent to a greater or lesser degree in all types of compensators, as one is in obtaining a simple and inexpensive construction, and one which can be sold at a price to meet the demand. It will be understood, however, that this invention may be applied to other types of projectors and cameras.

The viewers heretofore used have embodied an optical compensator in the form of a solid prism which has the cross section of a regular polygon. The objection to this type of compensator is the expense incurred in fabricating such a compensator. For instance, the grinding of plane parallel faces on an optical substance, such as glass, is a difficult and costly procedure when one has to provide a series of pairs of such parallel faces disposed at a uniform angle to each other, and each of the same width, these requirements being the conditions necessary to the manufacture of a compensator having a cross section in the form of a regular polygon.

It is another object of this invention to provide a compensator which is made up of sheets of optical material, thereby avoiding the costly grinding operation referred to above.

It is a further object to provide an optical compensator which is simple in form, and in which the several elements may be inexpensively assembled.

Various other objects, features and advantages will become apparent as the description proceeds.

With reference now to the drawings, in which like reference numerals designate like parts—

Fig. 1 is a diagrammatic representation of a preferred embodiment of this invention as applied to a projector;

Fig. 2 is an enlarged end view of the compensator shown in Fig. 1;

Fig. 3 is a sectional view taken along line 3—3 of Fig. 2;

Figure 4:
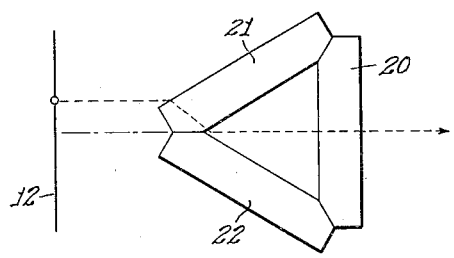
Figure 8:
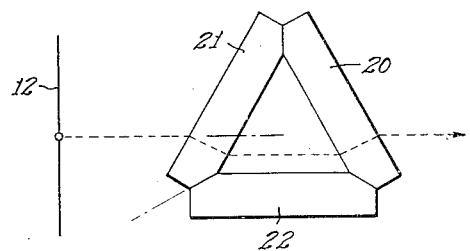
Figure 5:
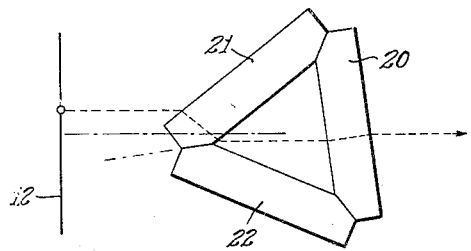
Figure 9:
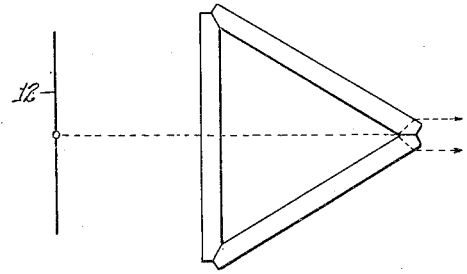
Figure 6:
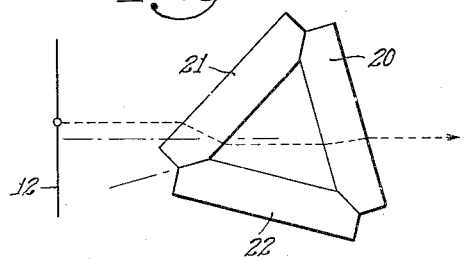
Figure 10:
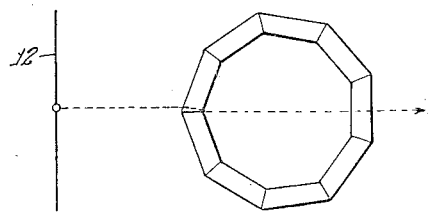
Figure 7:
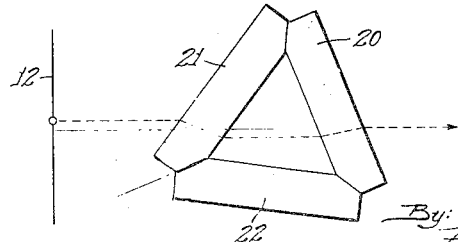

Figs. 4 to 8, inclusive, are diagrammatic representations of the manner in which displacement is effected as the compensator is rotated through a series of different angular positions; and Figs. 9 and 10 illustrate modified forms of this invention.

In Fig. 1 is shown more or less diagrammatically, the principal elements of a projector embodying this invention. These constitute a light source 10, a condensing lens 11, a film 12, a compensator 13, a projection lens 14, and a screen 15. These elements are optically aligned, as shown.

The film 12 is caused to pass over a sprocket wheel 16, and another wheel 19. The sprocket wheel 16 is mounted upon a driven shaft 18, and is provided with teeth 17 which engage the usual apertures in the film. The sprocket wheel and its associated parts are adapted to be driven continuously at a uniform velocity of rotation.

The compensator 13 is a triangular element made up of a series of three plates 20, 21 and 22, of suitable optical material, such as glass, methyl methacrylate, polystyrene, or the like. The opposite surfaces of each plate are plane surfaces which are parallel to each other. The separate plates are joined to each other at their edges, as by cement, to form a hollow triangular prism. The compensator is mounted on suitable holding means designated generally by the reference numeral 23. This means constitutes a triangular block 24 which is adapted to fit within the compensator, as shown in Figs. 2 and 3, and which may be cemented thereto. The block is provided with a circular flange 25, and is mounted at one end of a stub shaft 26. Thus the compensator may be held for rotation about a longitudinal axis. The compensator and holding means are driven by means of a gear 27 on the shaft 26, which meshes with an idler 28, which idler is in turn driven by a gear 29 secured to the driven shaft 18.

The geometrical figure formed by the plates of the compensator should be a regular polygon having an odd number of sides, in this instance, an equilateral triangle, and the axis of rotation is the center of the polygon.

Figs. 4 to 8 show in diagrammatic form the operation of the compensator 13 as it rotates through an angle of thirty degrees, the figures being shown at 7.5 degrees increments.

This rotation of 30 degrees compensates for the linear displacement of the film 12 through a distance of half a frame. Therefore during a complete rotation of the compensator, six frames should be caused to pass the optical axis. The gears 27, 28 and 29 are so proportioned as to maintain this ratio.

The shutter effect may be reduced by increasing the size of the polygon with respect to the thickness of the plates or refracting elements. Thus, in the modification shown in Fig. 9, which is of reduced dimensions with respect to Figs. 4-8, that portion of the screen which is not illuminated is the area between the two arrows. By enlarging the polygon, one reduces the length of time it takes for the polygon to rotate through the position shown in Fig. 9; hence, the shutter effect is reduced.

The principles of this invention are applicable to compensators of this type having a greater number of sides than three. However, the operation is similar only when the compensator has an odd number of sides. In Fig. 10, for instance, is shown a modified form of this invention in which the compensator has nine sides. The greater the number of sides, the smaller the aberration which is inherent in optical compensators.

The foregoing description and the appended drawings are intended to be illustrative only, and the invention is to be limited only by the appended claims.

We claim:

1. An optical compensator comprising two parallel surface refracting elements mounted at an acute angle with respect to each other, and adapted to be rotated through a series of positions in which one of said refracting elements slopes positively with respect to a light beam passing therethrough, and the other slopes negatively, whereby the differential displacement of said light beam changes as said compensator is rotated, a shaft secured to said elements and projecting from one end thereof and having its axis disposed equidistant from the surfaces of said elements, said elements being arranged so that the space between them is open to the atmosphere.

2. An optical system comprising means for producing a light beam for projection on a screen, means providing a path for a film to be advanced across said light beam, an optical compensator rotatably mounted in the path of said light beam, and means to rotate said optical compensator in synchronism with the movement of said film so as to displace the image of said film into a position in which said image remains substantially stationary, said optical compensator comprising a plurality of plates of parallel surface, optical material arranged in the form of a hollow prism having a cross section of a regular polygon of an odd number of sides, and means secured to said plates including a shaft projecting from one end thereof by means of which said compensator may be rotatably mounted.

3. An optical system comprising a rotatably mounted compensator, means for advancing a film along a path adjacent said compensator, means to cause a light beam to pass through said compensator and through said film, said compensator comprising an odd number of sheets of parallel surface transparent material disposed in abutting relationship to form a hollow equilateral prism, the longitudinal axis of said prism being substantially perpendicular to said light beam and being arranged substantially parallel to the width of said film, and means for rotating said compensator about its longitudinal axis in synchronism with the movement of said film, whereby the image of said film will remain substantially stationary during a portion of the time that one of said sheets is rotated past the axis of said light beam.

4. An optical system comprising means for producing a light beam for projection on a screen, means including a film sprocket providing a path for a perforated film to be advanced across said light beam, an optical compensator rotatably mounted in the path of said light beam, said optical compensator comprising three parallel surface refracting elements arranged in the form of a hollow prism having a cross section of a regular polygon, and means for rotatably mounting said elements including shaft projecting from one thereof and a gear mounted on said shaft, and means establishing a driving connection between said film sprocket and said gear to rotate said optical compensator in synchronism with the movement of said perforated film so as to displace the image of said perforated film into a position in which said image remains substantially stationary.

5. An optical system comprising a rotatably mounted compensator, means for advancing a perforated film along a path adjacent said compensator, means to cause a light beam to pass through said compensator and through said film, said compensator comprising three refracting elements which are joined together at their edges to form a hollow equilateral triangular prism, the longitudinal axis of said prism being substantially perpendicular to said light beam and being arranged substantially parallel to the width of said film, and means for rotating said compensator about its longitudinal axis in synchronism with the movement of said film whereby the image of said film will remain substantially stationary during a portion of the time that one of said elements is rotated past the axis of said light beam.

6. An optical system comprising means for producing a light beam for projection on a screen, a movable object disposed in the path of said light beam, an optical compensator rotatably mounted in the path of said light beam, and means to rotate said optical compensator in synchronism with the movement of said object so as to displace the image of said object into a position in which said image remains substantially stationary, said optical compensator comprising two parallel surface refracting elements mounted at an acute angle with respect to each other, and adapted to be rotated through a series of positions in which one of said refracting elements slopes positively with respect to said light beam passing therethrough, and the other slopes negatively, whereby the differential displacement of said light beam changes as said compensator is rotated.

JACK BRISKIN.
JOSEPH A. MANKAWICH.

(References on following page)

REFERENCES CITED

The following references are of record in the file of this patent:

UNITED STATES PATENTS

| Number | Name | Date |
|---|---|---|
| 71,309 | Kane | Nov. 26, 1867 |
| 1,264,374 | DeFlorez | Apr. 30, 1918 |
| 1,765,904 | Chavaroux | June 24, 1930 |
| 1,818,410 | Leventhal | Aug. 11, 1931 |
| 2,070,033 | Tuttle | Feb. 9, 1937 |
| 2,143,145 | Farnsworth | Jan. 10, 1939 |
| 2,288,079 | Fitz | June 30, 1942 |